April 23, 1963
R. SCHWARZ
3,086,642
TRANSFER DEVICE
Filed July 11, 1961
3 Sheets-Sheet 1
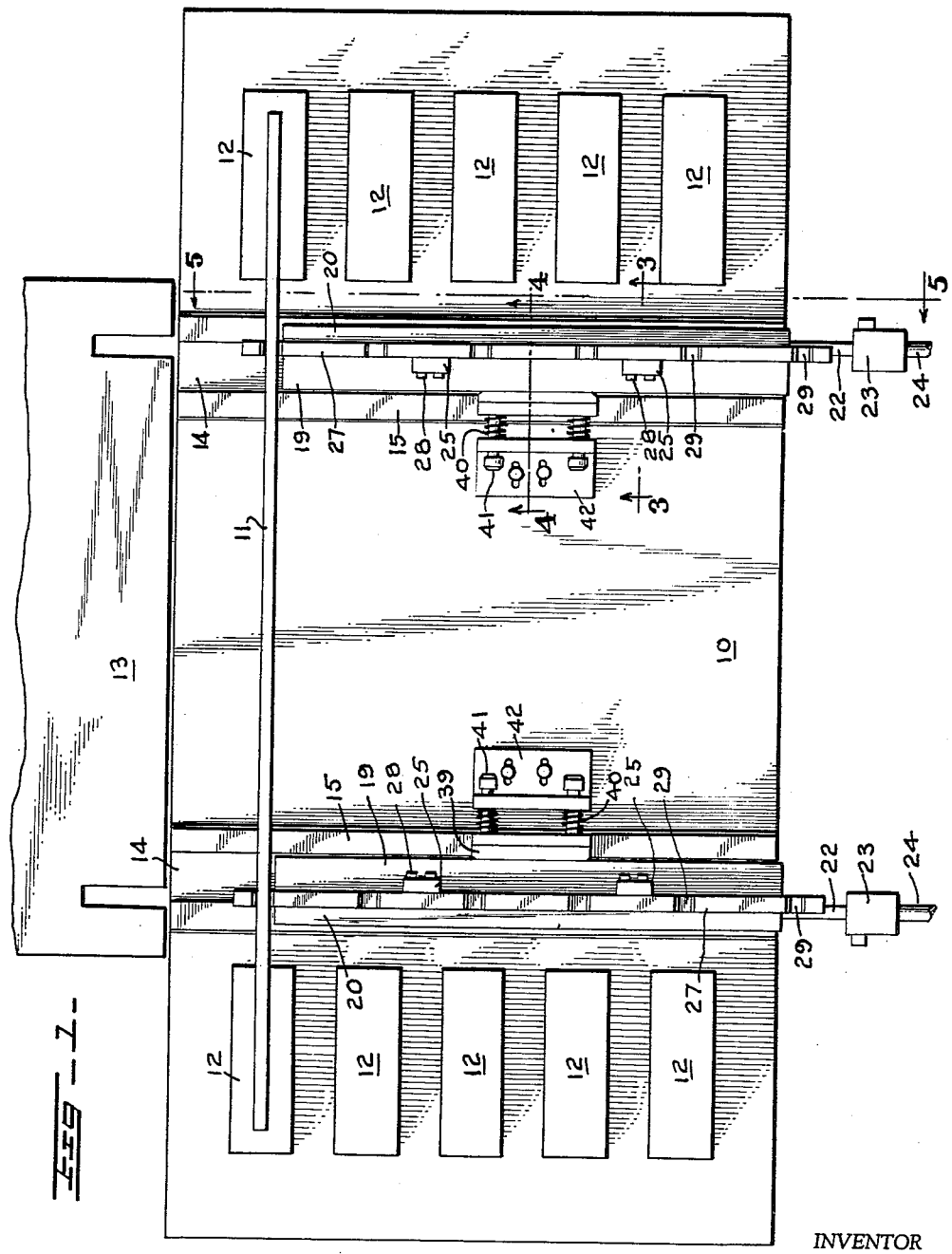
Fig-1-
INVENTOR
RALPH SCHWARZ
BY Aaron R. Townshend
ATTORNEY

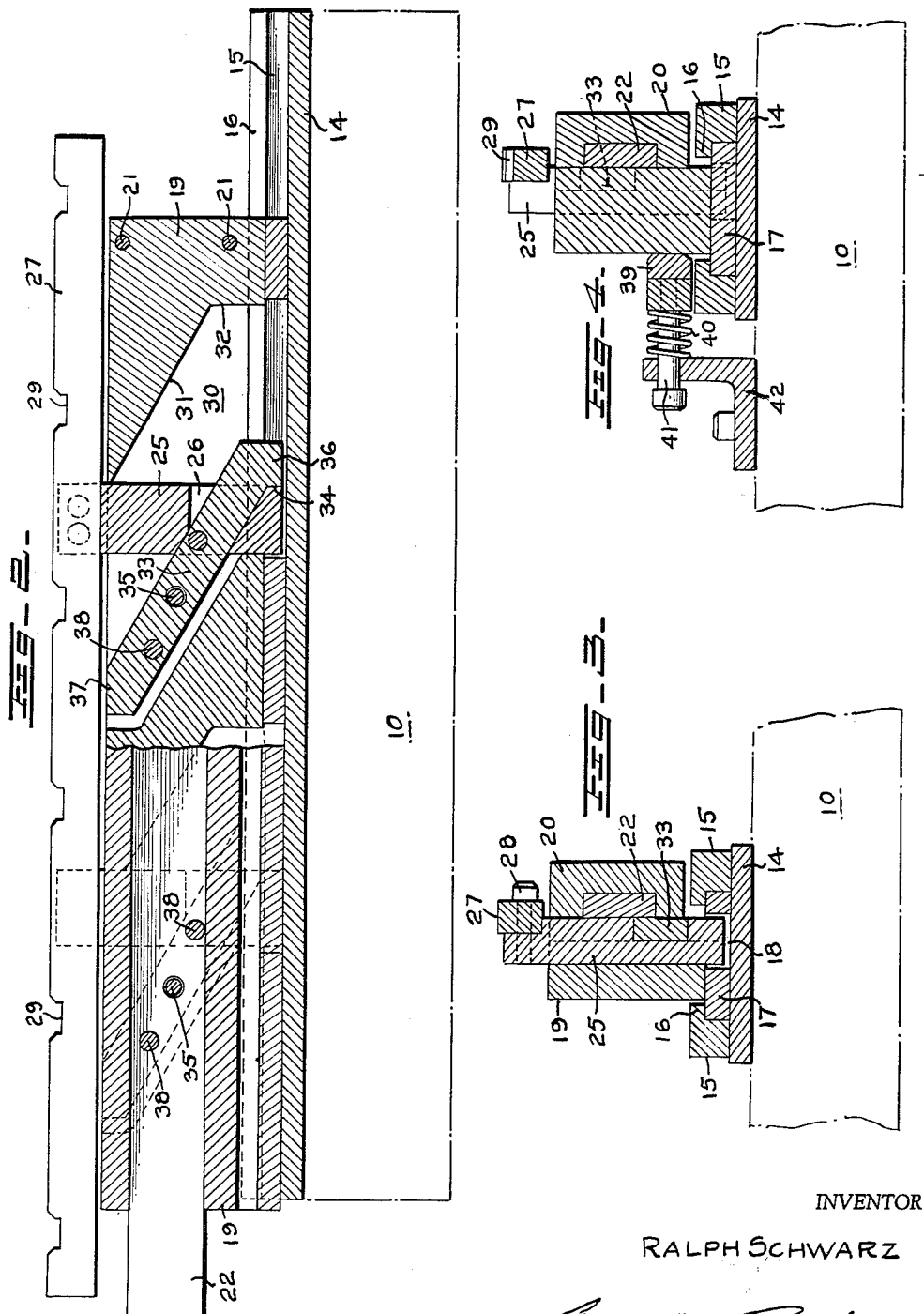

April 23, 1963  R. SCHWARZ  3,086,642
TRANSFER DEVICE
Filed July 11, 1961  3 Sheets-Sheet 3
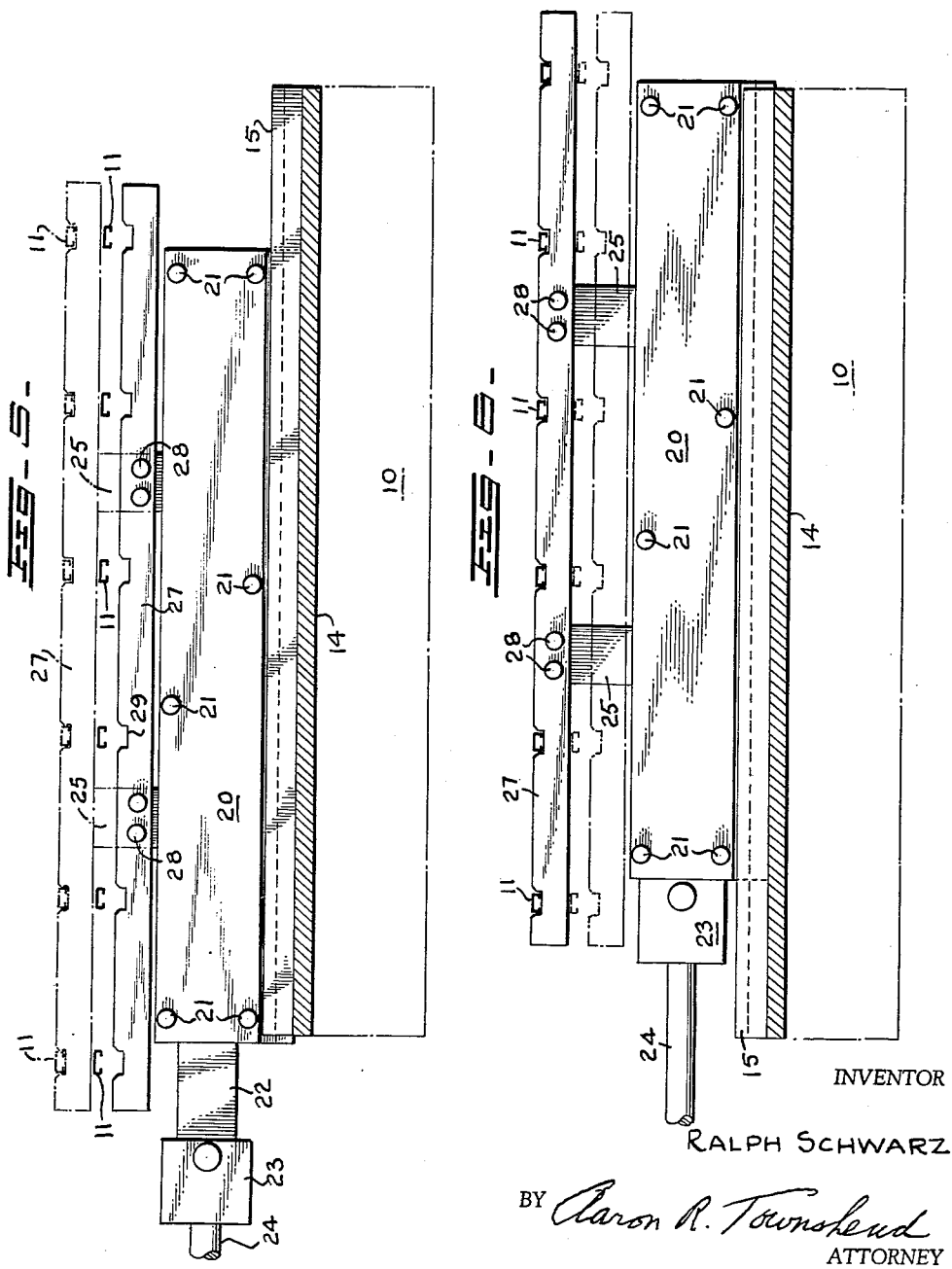
INVENTOR
RALPH SCHWARZ
BY Aaron R. Townshend
ATTORNEY United States Patent Office 3,086,642
Patented Apr. 23, 1963

3,086,642
TRANSFER DEVICE
Ralph Schwarz, % Florida Production Engineering Company, P.O. Box 630, Daytona Beach, Fla.
Filed July 11, 1961, Ser. No. 123,291
5 Claims. (Cl. 198—218)

This invention relates to the art of transfer devices for indexing work successively past a series of processing stations, at each of which the work is subjected to treatment. In particular, the invention is concerned with mechanical means and movement for progressively advancing the work along a rectilinear path of travel in which, at intervals corresponding to the location and number of processing stations, the work is reciprocated in a different path of travel.

The present invention has particular utility in connection with machine tools such as power presses, punches, and the like which require that the work be lowered vertically onto a die block, plate, or other base for processing thereon, following which it is lifted therefrom and then conveyed horizontally to another station. So far as I am aware, the art prior to the advent of this invention has accomplished the requisite movements always through the agency of separate and independent mechanisms: one for lifting and lowering and another for effecting horizontal transfer, thus requiring the application of a vertically directed force and then the application of an independent and horizontally directed force.

An object of the present invention is to provide a transfer device of the general character indicated above, in which both the requisite vertical and horizontal movements are effected through the agency of acuator means movable in a rectilinear path in the direction of only one of said movements.

Another object is to provide a transfer device having a work carrier movable sequentially in two different rectilinear paths of travel, one of which is angled relative to the other, and an actuator for the carrier movable in a path of travel that is parallel to only one of the other two paths of travel.

A further object is to provide a transfer device of novel design, including a reciprocable work carrier movable between opposite limits in a horizontal plane and mounting work supporting means reciprocable in a vertical plane, with actuator means common to both.

Other objects will be apparent from the following description taken in connection with the accompanying drawings in which:

FIG. 1 is a top plan view of the transfer device of the present invention operatively mounted on the die base of a power punch, press, or the like.

FIG. 2 is a fragmentary, staggered, longitudinal section through one of the two main component units of the device.

FIG. 3 is a section taken on line 3—3 of FIG. 1.

FIG. 4 is a section taken on line 4—4 of FIG. 1.

FIG. 5 is a sectional view taken on line 5—5 of FIG. 1 showing in full line the lowered position of the work carrier transfer bar and in chain line the raised position thereof at the start of a transfer stroke of the actuator.

FIG. 6 is a view similar to FIG. 5 but showing in full line the raised position of the work carrier transfer bar and in chain line the lowered position thereof at the start of a return stroke of the actuator.

An illustrative, but not restrictive, embodiment of the present invention is herein shown in operative position on the die base plate 10 of a known type of vertical power press for making automotive trim moulding of various sizes and shapes from work pieces 11 that are placed on the transfer device from a loading station at the front of the machine. Operation of the transfer device carries the work successively over and past work processing stations 12 to a discharge station at the rear of the machine, where they are delivered onto a platform 13. In the known type of machine with which the transfer device is here shown associated the processing stations are mounted on the base 10 in two laterally spaced series from front to back and with the transfer device mounted on the base centrally between them in such a manner that the end portions of the work pieces seated on the transfer device extend over the processing stations.

The transfer device includes a pair of oppositely facing work carrier assemblies of identical construction. Description of one will suffice for both, and is given with respect to the assembly shown at the right in FIG. 1.

The work carrier assembly is mounted for longitudinal reciprocation on a horizontal guide track 14 fixedly secured on the base 10 and extending from front to back parallel to and spaced laterally inward from the adjacent series of the processing stations 12. The track includes a pair of upright side rails 15 extending from end to end in parallel spaced relation and having inturned top flanges 16 which overlie the side edge portions of a flat foot plate 17 that is longitudinally reciprocable in and along the guide track. This plate 17 is provided intermediate its ends with an axially spaced and aligned pair of closed-end longitudinal slots 18 for a purpose to be explained, and is welded or otherwise rigidly attached to the bottom of a vertically upstanding inner side wall member 19 of rectangular configuration and which extends the full length of the foot plate. The width of wall member 19 is only slightly less than the distance between the opposed flanges 16 of the guide track side rails 15, as shown best in FIG. 4.

A complemental outer side wall member 20 coextensive with the inner wall member 19 is attached to wall 19 by detachable fastening elements 21, here shown as bolts. The top and ends of the two walls are flush but the horizontal plane of the bottom of outer wall 20 is spaced above the top of the track side rail 15 which it overlies. It is obvious that the connected assembly of inner and outer side walls and foot plate is movable along the track 14 as a unit. Reciprocation of this unit is effected through the agency of an actuator 22 that is slidably seated in a complemental guide channel which extends horizontally along the full length of the outer wall member 20 open to its interior face. The front end of the actuator slide has an operative connection 23 with a motor element 24 which operates to reciprocate the work carrier assembly between limit positions on the track 14.

The interior face of the inner side wall member 19 is provided with a pair of vertical recessed channels corresponding in spacing and location to the slots 18 in foot plate 17. These channels are open-ended at top and bottom and are open over their full length to the interior of the assembly. They house in slidable relation a pair of complemental vertical posts 25 which in the fully lowered position of the posts extend with a slight side clearance into the foot plate slots 18 and terminate slightly above the track 14 as shown in FIG. 3. The posts abut the flush interior faces of the outer side wall member 20 and the actuator 22 in slidable face contact. Each post is provided in its lower-half portion with a camway channel 26 of the shape and location shown in FIG. 2. The depth of channel 26 is half the width of the post and the channel is open to the face of the post which abuts the actuator slide 22 and the outer wall member 20. A horizontal work transfer bar 27 is rigidly attached by fastening elements 28 to the upper ends of the posts 25. The transfer bar is formed in its top face with a series of work seating recesses 29 spaced apart a distance corresponding to the length of travel of the work carrier required to advance a work piece from one processing station to the next. The number of recesses corresponds to the number of processing stages with the addition of one for the loading station at the front of the machine and one for the discharge at the back; so that the overall length of the transfer bar is to that extent greater than the length of the work carrier assembly.

The camway-carrying portion of each post 25 extends laterally into and bisects an inclined channel 30 formed in the interior face of the inner wall member 19. This channel is open at its top and bottom ends and extends downwardly from front to rear with its major axis inclined at an angle of forty-five degrees relative to the vertical axis of the post 25, and has front and rear walls parallel to its major axis and spaced apart longitudinally of the work carrier assembly for a distance slightly greater than the length of travel of the work carrier required to advance a work piece from one processing station to the next plus the width of the associated post 25 as defined longitudinally with respect to the work carrier. The inclined rear wall 31 of the channel 30 terminates in a vertical shoulder 32 that functions as a rearward travel limit stop for a cam 33, now to be described. The forward travel limit stop for the cam is constituted by a vertical shoulder 34 at the lower end of the bottom wall of the camway slot 26 in post 25. It will be seen that the bottom wall of slot 26 is inclined parallel to the front and rear walls of the channel 30. At this point it should be noted that the distance between the two limit stop abutments 32 and 34 is exactly equal to the length of longitudinal travel of the work carrier required to advance a work piece from one processing station to the next.

Cam 33 is a bar cam fixedly mounted on the actuator slide 22 for movement therewith. It is disposed entirely within the channel 30 of the inner wall member 19, within which it is both vertically and horizontally slidable. As shown in FIG. 2, the major axis of the cam is inclined at an angle of forty-five degrees relative to the vertical. It is attached to the actuator slide by securing means 35, such as a bolt or the like, shown in section in FIG. 2, in such manner that its lower portion extends through the camway slot 26 and terminates in an abutment shoulder 36 which rides freely in the slot 18 of foot plate 17. The shoulder has vertical front and rear faces which are adapted to seat, respectively, against the stops 34 and 32. At its upper end the cam terminates in a flat face portion 37, constituting a dwell, flush with the horizontal top faces of the wall members 19 and 20. The cam is anchored in its fixed position of inclination by studs or pins 38 disposed in and extending laterally between the cam and the actuator slide before and behind the attaching means 35.

The front and rear edge faces of bar cam 33 are inclined parallel to the inclined end walls of the channel 30; so that the front edge face of the cam rides over the bottom wall of the camway slot 26 and the back edge face of the cam rides beneath a complemental inclined corner of the post 25 at the top front of the slot 26. It will be apparent from this relationship of the parts that when the actuator slide 22 and its attached cams are moved rearward (to the right in FIG. 2) the posts 25 will ride up and thus lift the transfer bar 27 until the top dwells 37 of the cams pass beneath the posts at the top of the camway slots 26, and that the posts and the transfer bar will be lowered during forward movement of the cam between the abutment 32 and 34.

The inner side wall member 19 of each work carrier unit is at all times in frictional engagement with a brake 39 that is urged against the face of the wall member under the loading of spring means 40 mounted on stems 41 slidably supported in brackets 42 attached to the machine base.

In operation, a work piece is seated in the foremost pair of transversely registered recesses 29 in the transfer bars of the work carrier units fom a loading station at the front of the machine. At the start the parts of the carrier units, which move in unison, are in the positions shown in full lines in FIGS. 2 and 5. The transfer bar is in its fully lowered position. Motor element 24, which can be any desired power applying means, is then operated to apply a horizontal force to move the actuator slide 22 rearwardly (to the right side in FIG. 2) and thus advance the bar cams 33 in their channels 30 until their further advance is arrested by engagement of their lower end shoulders 36 against the abutments 32. During this first portion of a work transfer stroke of the actuator 22 the work carrier assembly of the wall members 19 and 20 is held against movement along track 14 by friction of the spring-loaded brake 39. In consequence, the advance of the cams 33 acting on the posts 25 lifts them straight up vertically and elevates the transfer bars into their upper limit position as shown by chain line in FIG. 5, at which point the cam dwells 37 will be engaged beneath the posts so that they cannot move down until released.

When the cam shoulders 36 contact the abutments 32, the cams continue to advance through the remainder of the stroke, thereby forcing the entire work carrier assembly to move rearwardly along the track 14 to a limit position (determined by the motor mechanism), the extent travel being that required to advance the work piece from its loading station to its proper position in alignment with and above the first of the processing stations 12. It will be understood that the force of the actuator movement is sufficient to overcome the drag of the brakes 39.

On the return stroke of the actuator the cam shoulders 36 move away from the carrier abutments 32, and the brakes hold the carrier assembly against return movement while the cams 33 travel forward with the actuator. During this first part of the return stroke the posts 25 are lowered straight down to lower the transfer bar 27 the position shown in chain line in FIG. 6. The descent of the transfer bars deposits the work piece on the front pair of the processing stations, thereby stripping it from its seats 29 in the transfer bars. When the forwardly moving shoulders 36 of the cams abut the post stops 34 the force of the actuator overcomes the brake drag and the entire work carrier assemblies move forward along the tracks to their forward limit position as seen in FIGS. 1, 2 and 5. A second work piece is then seated on and across the transfer bars at the loading station and the cycle of operations is repeated, each successive cycle causing the work pieces to be transferred from one station to the next following station until delivered on the discharge platform 13 at the rear.

It is to be understood that the invention is not limited to the structure shown and described. It is capable of embodiment in other forms and has other uses. The particular character of processing at individual processing stations is variable and optional, and also the nature of the work pieces. Any suitable motor mechanism may be employed to reciprocate the work carriers and their actuator slides.

I claim:

1. A transfer device for indexing work pieces past a succession of processing stations, comprising a base; a work carrier reciprocable therefrom adjacent the processing stations for movement in a horizontal path of travel; work piece supporting means mounted in the carrier for reciprocation in a vertical path of travel to lift and lower work pieces from and to the processing stations; an actuator mounted in the carrier for reciprocation therein in the horizontal path of travel of the carrier; an operating member carried by and movable with the actuator in driving engagement with both said carrier and the work piece supporting means for effecting reciprocation of both; and means for reciprocating the carrier.

2. In the structure of claim 1, said work carrier comprising a pair of separable side wall members connected together as a unit; said actuator being slidable longitudinally in one wall member; said work piece supporting means being slidable vertically in the other side wall member; and said operating member that is carried by the actuator being a cam in camming engagement with said work piece supporting means, the cam having abutment means operative to engage at time a portion of one side wall member and at times to engage a portion of said work piece supporting means.

3. In the structure of claim 1, said work carrier including a pair of interconnected side wall members, one having a channel recess in its interior face and longitudinally thereof; and said operating member that is carried by the actuator comprising a cam carried by and with the actuator and movable in the channel recess; and cam means on said work piece supporting means in operative engagement with the actuator means to effect vertical reciprocation of the work piece supporting means during horizontal reciprocation of the actuator.

4. A transfer device comprising a base; a track thereon; a work carrier assembly reciprocable on said track between predetermined end limits of travel; an actuator reciprocable within the carrier assembly; cooperating means on said actuator and on the carrier assembly effecting movement of the carrier assembly by and with the actuator during a predetermined portion only of one stroke of the actuator and during a similar portion only of an opposite stroke of the actuator; and power means for effecting reciprocation of the actuator.

5. In the device of claim 4, said work carrier assembly including a work piece supporting member mounted in the assembly for lifting and lowering relative thereto; and said actuator having means in driving connection with the work piece supporting member and operative to lift and lower the same only during periods of rest of said carrier assembly.

References Cited in the file of this patent

UNITED STATES PATENTS 2,954,863     Staples _____ Oct. 4, 1960